United States Patent [19]

Haslop et al.

[11] Patent Number: 5,476,519
[45] Date of Patent: Dec. 19, 1995

[54] DYE SUSPENSIONS

[75] Inventors: William P. Haslop, Whitehaven; Jill E. Newton, Wordsley; Richard M. Clapperton, Stourbridge, all of England

[73] Assignee: Albright & Wilson, Limited, Warley, England

[21] Appl. No.: 400,548

[22] Filed: Mar. 8, 1995

Related U.S. Application Data

[63] Continuation of Ser. No. 246,939, May 20, 1994, abandoned, which is a continuation of Ser. No. 70,501, Jun. 1, 1993, abandoned, which is a continuation of Ser. No. 951,940, Sep. 25, 1992, abandoned, which is a continuation of Ser. No. 743,141, Aug. 9, 1991, abandoned.

[30] Foreign Application Priority Data

Aug. 15, 1990 [GB] United Kingdom ................ 9017924
Feb. 2, 1991 [GB] United Kingdom ................ 9103772

[51] Int. Cl.$^6$ ............................ C09B 67/00; C11D 17/00
[52] U.S. Cl. ...................... 8/527; 8/528; 8/525; 8/648; 8/662; 8/904; 8/907; 8/911; 8/912; 252/174; 252/173; 252/DIG. 14
[58] Field of Search ................ 8/527, 528, 648, 8/662, 904–912; 252/135, 173, 174, DIG. 14

[56] References Cited

U.S. PATENT DOCUMENTS

| | | | |
|---|---|---|---|
| 4,110,073 | 8/1978 | Mollet et al. | 8/549 |
| 4,189,445 | 2/1980 | Oppenlaender et al. | 252/353 |
| 4,218,218 | 8/1980 | Daubach et al. | 8/550 |
| 4,515,704 | 5/1985 | Akred et al. | 252/135 |
| 4,618,446 | 10/1986 | Haslop et al. | 252/135 |
| 4,659,497 | 4/1987 | Akred et al. | 252/135 |
| 4,752,298 | 6/1988 | Burglin et al. | 8/527 |
| 4,793,943 | 12/1988 | Haslop et al. | 252/135 |
| 4,871,467 | 10/1989 | Akred et al. | 252/135 |

FOREIGN PATENT DOCUMENTS

| | | |
|---|---|---|
| 0013257 | 7/1980 | European Pat. Off. |
| 0312343 | 4/1989 | European Pat. Off. |
| 2123846 | 2/1984 | United Kingdom |
| 2153380 | 8/1985 | United Kingdom |

Primary Examiner—Margaret Einsmann
Attorney, Agent, or Firm—Frishauf, Holtz, Goodman, Langer & Chick

[57] ABSTRACT

Water insoluble or sparingly soluble dyestuffs such as disperse dyes as concentrates for making up dyebaths or for use as printing pastes, and optical brightening agents for laundry detergents are formulated as stable suspensions in aqueous structured surfactants.

16 Claims, No Drawings

5,476,519

DYE SUSPENSIONS

This application is a Continuation of application Ser. No. 08/246,939, filed May 20, 1994 (abandoned) which is a continuation application of Ser. No. 08/070,501 filed Jun. 1, 1993 (abandoned), which is a continuation application of Ser. No. 07/951,940 filed Sep. 25, 1992 (abandoned), which is a continuation application of Ser. No. 07/743,141 filed Aug. 9, 1991 (abandoned).

The present invention provides a novel means of suspending relatively water-insoluble dyestuffs such as disperse dyes and optical bleaches in aqueous media without the need to employ environmentally harmful solvents, and without the need for spray drying or handling dust producing powders.

Dyestuffs, and in particular disperse dyes, are often required as concentrated aqueous suspensions of solid for use either as printing pastes or for dilution to form dyebaths. A problem with the suspensions available hitherto for the latter purpose has been poor storage stability, leading to sedimentation on standing. The properties required for effective printing pastes have also proved difficult to obtain by conventional means. The paste must be capable of easy extrusion, but must not run after application to the fabric. This requires a strongly thixotropic medium. Finally, the excess paste must be readily removed by rinsing. Pastes which are currently available present problems on rinsing.

Optical bleaches are sparingly soluble fluorescent dyes used in detergents to make laundered fabrics look brighter. They are conveniently supplied to the detergent formulator as spray dried powders which are expensive to dry and cause potential hazards in handling due to dust formation. They are added typically to detergent slurries for spray drying or to liquid laundry detergents. Accurate addition of the powder to the slurry or liquid and even dispersion may present problems.

We have discovered that substantially water-insoluble or sparingly soluble disperse dyes may be suspended in concentrations of 1 to 65% by weight or higher in aqueous structured surfactant systems. The expression "structured surfactant system" refers to aqueous systems comprising surfactant structures larger than conventional spherical micelles, which interact to confer thixotropic properties on the aqueous medium. The structures may be solid, mesophase or liquid and may be in the form of multi layered spherulites, rods or discs or lamellae discontinuously dispersed or emulsified in the system or forming weak reticular structures.

The size of the structures may typically lie within the range 0.01 to 200 microns, preferably 0.5 to 20 microns. Structured surfactant systems are usually formed by the interaction of surfactants with dissolved electrolyte salts or bases. Such systems are present in some liquid detergents and cleaning compositions and have been described, for instance, in GB-2,123,846 and GB-A-2,153,380.

Use of structured surfactants to suspend dyestuffs offers a number of potential advantages. The structured surfactants are capable of suspending a wide range of particle sizes and may be adapted to a wide range of pH e.g. by appropriate choice of surfactant. The systems are generally obtainable in a shear stable form which facilitates wet milling, are physically storage stable over a wide range of temperatures and disperse readily to form stable dye baths. They can readily be incorporated in detergents e.g. by addition to slurries for spray drying or by mixing into liquid detergent formulations. Also very high payloads can be achieved in formulations which are easy and safe to handle.

Our invention provides a suspension comprising an aqueous structured surfactant having suspended therein particles or droplets of a substantially water insoluble or sparingly soluble dye. In particular our invention provides such suspensions which comprise water, sufficient surfactant to be able to provide a solid-suspending structure and, where required, sufficient dissolved surfactant-desolubilising electrolyte to form said structure. Preferably said dyes are disperse dyes or optical bleaches.

Preferably the product may be a dispersed or reticular lamellar structure such as those described in GB-2 123 846 or most preferably a spherulitic structure such as those described in GB-A-2 153 380. Other structures which may be present include G-phase, viscous isotropic phase, M-phase, and mixtures of phases.

Surfactants

The compositions of our invention preferably contain at least 2%, more usually at least 4%, e.g. at least 5% by weight of surfactants. The surfactants may constitute up to about 65% by weight of the composition, although we prefer on economic grounds to use lower concentrations e.g. less than 50%, preferably less than 45%, e.g. 8 to 30% by weight especially 10 to 20.

The surfactant may for example consist substantially of an at least sparingly water-soluble salt of sulphonic or mono esterified sulphuric acids e.g. an alkylbenzene sulphonate, alkyl sulphate, alkyl ether sulphate, olefin sulphonate, alkane sulphonate, alkylphenol sulphate, alkylphenol ether sulphate, alkylethanolamide sulphate, alkylethanolamide ether sulphate, or alpha sulpho fatty acid or its esters each having at least one alkyl or alkenyl group with from 8 to 22, more usually 10 to 20, aliphatic carbon atoms. Said alkyl or alkenyl groups are preferably straight chain primary groups but may optionally be secondary, or branched chain groups. The expression "ether" hereinbefore refers to oxyalkylene and homo- and mixed polyoxyalkylene groups such as polyoxyethylene, polyoxypropylene, glyceryl and mixed polyoxyethylene-oxypropylene or mixed glyceryl-oxyethylene, glyceryl-oxypropylene groups, or glyceryl-oxyethylene-oxypropylene groups, typically containing from 1 to 20 oxyalkylene groups. For example, the sulphonated or sulphated surfactant may be sodium or isopropylammonium dodecyl benzene sulphonate, potassium hexadecyl benzene sulphonate, sodium dodecyl dimethyl benzene sulphonate, sodium lauryl sulphate, sodium tallow sulphate, potassium oleyl sulphate, ammonium lauryl monoethoxy sulphate, sodium lauryl triethoxy sulphate, or monethanolamine cetyl 10 mole sethoxylate sulphate.

Other anionic surfactants useful according to the present invention include fatty alkyl sulphosuccinates, fatty alkyl ether sulphosuccinates, fatty alkyl sulphosuccinamates, fatty alkyl ether sulphosuccinamates, acyl sarcosinates, acyl taurides, isethionates, soaps such as stearates, palmitates, resinates, oleates, linoleates, rosins soaps and alkyl ether carboxylates and saponins.

Anionic phosphate esters including naturally occurring surfactants such as lecithin may also be used.

In each case the anionic surfactant typically contains at least one aliphatic hydrocarbon chain having from 8 to 22 preferably 10 to 20 usually an average of 12 to 18 carbon atoms, an ionisable acidic group such as a sulpho-, acid sulphate, carboxy, phosphono-or acid phosphate group, and, in the case of ethers, one or more glyceryl and/or from 1 to 20 ethyleneoxy and/or propyleneoxy groups.

Preferred anionic surfactants are amine salts, e.g. salts of monoethanolamine, diethanolamine, triethanolamine and alkyl amines containing up to seven aliphatic carbon atoms, such as isopropylamine. Other salts of commercial interest include those of sodium potassium, lithium, calcium, magnesium and ammonium.

The surfactant may optionally contain or consist of nonionic surfactants. The nonionic surfactant may be e.g. a $C_{10-22}$ alkanolamide of a mono or di- lower alkanolamine, such as coconut or tallow monoethanolamide or diethanolamide. Other nonionic surfactants which may optionally be present, include ethoxylated alcohols, ethoxylated carboxylic acids, ethoxylated amines, ethoxylated amides, ethoxylated alkylolamides, ethoxylated alkylphenols, ethoxylated glyceryl esters, ethoxylated sorbitan esters, ethoxylated phosphate esters, and the propoxylated, butoxylated and mixed ethoxy/propoxy and/or butoxy analogues of all the aforesaid ethoxylated nonionics, all having a $C_{8-22}$ alkyl or alkenyl group and up to 20 ethyleneoxy and/or propyleneoxy and/or butyleneoxy groups, or any other nonionic surfactant which has hitherto been incorporated in powder or liquid detergent compositions e.g. amine oxides. The latter typically have at least one $C_{8-22}$, preferably $C_{10-20}$ alkyl or alkenyl group and up to two lower (e.g. $C_{1-4}$, preferably $C_{1-2}$) alkyl groups. Other non-ionic surfactants include alkyl polyglucosides.

The preferred nonionics for our invention are for example those having an HLB range of 6–18 e.g. 8–12.

Our compositions may contain cationic surfactants, which include quaternary amines having at least one long chain (e.g. $C_{12-22}$ typically $C_{16-20}$) alkyl or alkenyl group optionally one benzyl group and the remainder of the four substituents short chain (e.g. $C_{1-4}$) alkyl groups. They also include imidazolines and quaternised imidazolines having at least one long chain alkyl or alkenyl group, and amido amines and quaternised amido amines having at least one long chain alkyl or alkenyl group. The quaternised surfactants are all usually salts of anions which impart a measure of water solubility such as formate, acetate, lactate, tartrate, chloride, methosulphate, ethosulphate, sulphate or nitrate.

Compositions of our invention may also contain one or more amphoteric surfactant, which include betaines, sulphobetaines and phosphobetaines formed by reacting a suitable tertiary nitrogen compound having a long chain alkyl or alkenyl group with the appropriate reagent, such as chloroacetic acid or propane sultone. Examples of suitable tertiary nitrogen containing compounds include: tertiary amines having one or two long chain alkyl or alkenyl groups and optionally a benzyl group, any other substituent being a short chain alkyl group; imidazolines having one or two long chain alkyl group and amidoamines having one or two long chain alkyl or alkenyl groups.

The specific surfactant types described above are only exemplary of the commoner surfactants suitable for use according to the invention. Any surfactant capable of forming a structured system may be included. A fuller description of the principal types of surfactant which are commercially available is given in "Surface Active Agents and Detergents" by Schwartz Perry and Berch.

Electrolyte

Dissolved electrolyte compounds are optional constituents of our compositions. For the purposes of this specification "electrolyte" means any water soluble, ionisable, non-surface-active compound which tends to desolubilise or "salt out" surfactants from solution or micellar solution.

Although it is preferred to prepare structured systems in the absence of electrolyte, if the surfactant concentration is sufficiently high, the mobility of such systems is sometimes insufficient unless the surfactant has been selected with great care. Addition of electrolyte permits the preparation of mobile structured systems containing relatively low concentrations of surfactant.

The electrolyte may be present in concentrations up to saturation. The concentration can be e.g. 1–50%. Typically the less the amount of surfactant present, the more electrolyte may be required to form a structure capable of supporting solid materials. We generally prefer to select the cheapest electrolytes on economic grounds. Thus electrolyte could typically be present in a concentration of at least 1% by weight based on the total weight of the composition, e.g. at least 2%, especially at least 3%. Usually the concentration is less than 30% more usually less than 15% e.g. less than 10% by weight. Typically where electrolytes are required, the concentration is from 3% to 4%.

The maximum electrolyte concentration depends, among other things, on the type of structure, and the viscosity required as well as considerations of cost. We prefer to form spherulitic systems as described in our application GB-A-2,153,380 in order to obtain a satisfactory balance between mobility and high payload of suspended dyestuff. The optimum concentration of elecrolyte for any particular type and amount of surfactant may be ascertained as described in our aforesaid application by observing the variation of electrical conductivity with increasing elecrolyte concentration until the first conductivity minimum is observed.

Preferably the concentration of surfactant and/or electrolyte is adjusted to provide a composition which is non-sedimenting on standing for three months at ambient temperature, or at 0° C. or 50° C. Preferably also said content is adjusted to provide a shear stable composition and, desirably, one which does not increase viscosity substantially after exposure to normal shearing.

Alternatively sufficient surfactant/electrolyte may be added to form a lamellar system as described in GB-2,123,846, e.g. by adding enough electrolyte to ensure that the liquid suspending medium separates on centrifuging at 800G for seventeen hours to form a lye phase containing little or no surfactant. The amount of water in the formulation may then be adjusted to obtain an optimum balance of mobility and stability. Lamellar systems are preferred for suspending certain optical bleaches which tend to destabilise spherulitic systems.

In addition to cost, choice of electrolyte may depend on the intended use of the suspension. Dye suspensions preferably contain non-toxic electrolytes, or concentrations insufficiently high to give rise to ill effects. Compositions may contain auxiliary or synergistic materials as the electrolyte or part thereof. The selected electrolyte should also be chemically compatible with the substance to be suspended. Typical electrolytes for use in the present invention include alkali metal, alkaline earth metal, ammonium or amine salts including chlorides, bromides, iodides, fluorides, orthophosphates, condensed phosphates, phosphonates, sulphates, bicarbonate, carbonates, borates, nitrates, chlorates, chromates, formates, acetates, oxalates, citrates, lactates, tartrates, silicates, hypochlorites and, if required to adjust the pH, e.g. to improve the stability of the suspended solid or dispersed liquid or lower the toxicity, acids or bases such as hydrochloric, sulphuric, phosphoric or acetic acids, or sodium, potassium, ammonium or calcium hydroxides, or alkaline silicates.

Electrolytes which form insoluble precipitates with the surfactants or which give rise to the formation of large crystals e.g. more than 1 mm on standing are preferably avoided. Thus, for example, concentrations of sodium sulphate close to its saturation concentration in the composition at room temperature are undesirable.

Suspended Dyestuff

The particle or droplet size of the suspended material may vary widely. The maximum size that can be stably suspended depends upon the density of the suspended phase and the Yield Point of the suspending medium. However, for practical purposes we prefer that the maximum particle size is less than 1 mm, preferably less than 500 microns. Most preferably the mean particle size and majority of the particles are in the range 0.005 to 2.5 microns e.g. 0.01 to 2 especially 0.01 to 1 microns.

Where the dyestuff is a low melting solid, it is sometimes desirable to incorporate a small amount of a melting point depressant to inhibit phase changes during manufacture or storage of the composition. Such changes may give rise to instability.

The proportion of the suspended phase can vary widely between about 1% by weight and about 80% by weight but most commonly is from 2 to 50%. The proportion depends on the intended use of the concentrate, higher proportions (e.g. 15 to 40%) being preferred where the concentrate is to be dispersed in water to form a dyebath or added to a detergent formulation and lower concentrations (e.g. 1 to 15%) when the concentrate is to be used directly as a printing paste.

The viscosity of the suspensions at 21 $sec^{-1}$ shear is typically from 0.001 to 50 Pascal seconds e.g. 0.1 to 1 Pascal seconds, preferably 0.2 to 0.5 Pascal seconds.

The dyestuff is typically a disperse dye or an optical bleach (optical brightening agent or OBA) for use in laundry detergents. The optical brightening agent can be present e.g. in an amount of 14% or 15% to 40% by weight.

Typical examples of OBA's which may be used in the present invention include: ethoxylated 1, 2-(benzimidazolyl) ethylene; 2-styrylnaphth[1,2d-]oxazole; 1,2-bis(5' methyl -2-benzoxazolyl) ethylene; disodium-4,4'-bis(6-methylethanolamine-3-anilino-1,3, 5-triazin-2"-yl)-2,2'-stilbene sulphonate; N-(2-hydroxyethyl-4, 4'-bis(benzimidazolyl)stilbene; tetrasodium 4,4'-bis( 2"-hydroxyethyl)-amino-6"(3"-sulphophenyl) amino-1", 3", 5"-triazin- 2"-yl amino]-2,2'-stilbenedisulphonate; disodium-4-(6"-sulphonaphtho [1',2'-d]triazol-2-yl)-2-stilbene sulphonate; disodium-4,4'-bis [4"-(2"-hydroxy ethoxy)-6"-amino-1", 3", 5"-triazin-2"-yl amino]-2, 2'-stilbenedisulphonate; 4-methyl-7dimethyl aminocoumarin; and alkoxylated 4,4'-bis(benzimidazolyl) stilbene.

Crystal Growth and Stability

One problem which arises with many suspensions of dyestuffs in water is lack of stability due to crystal growth or chemical interaction between the suspended dyestuff and the aqueous medium and/or other components of the formulation. For instance pairs of dyestuffs which act complementarily may be chemically incompatible when stored together in aqueous concentrates.

The present invention provides according to a preferred embodiment a method of protecting dyestuffs suspended in an aqueous based formulation against interaction with the aqueous suspending medium or with other components of the formulation. We have discovered that dyestuffs encapsulated in water soluble encapsulants such as water soluble film-forming polymers, may be stably suspended in aqueous structured liquids and, surprisingly, retain their activity to a substantial degree on storage.

Encapsulation in water soluble film forming polymers and gums is a well known technique for binding a wide variety of sensitive ingredients, including pharmaceuticals and enzymes, and protecting them from deterioration during storage in air. Such capsules are conventionally used in an aqueous medium, which dissolves the capsule and releases the active ingredient immediately prior to use. It is not, therefore, on the face of it, possible to use such capsules to afford protection on storage in aqueous media.

We believe that water soluble capsules in structured liquids are surprisingly stable in the presence of relatively high electrolyte contents. Electrolyte is sometimes required to interact with surfactants, which usually form a spherulitic or lamellar structure capable of suspending insoluble particles.

The suspending properties of a structured liquid detergent assist in preventing the protected dyestuff from undergoing agglomeration and sedimentation. We believe the electrolyte also prevents the dissolution of the water soluble capsules.

The latter protect the dyestuffs until the formulation is diluted for use, when the electrolyte is diluted sufficiently for the capsule to dissolve and release the dye.

According to one embodiment our invention provides an aqueous based dyestuff formulation comprising an aqueous suspending medium having suspended therein particles or droplets of a disperse dye encapsulated in or coacervated with a water soluble encapsulant which is insoluble in said aqueous suspending medium. Preferably the aqueous suspending medium comprises a surfactant and sufficient electrolyte to form the surfactant into a structure capable of supporting suspended solid particles and preventing dissolution of the encapsulant.

According to a preferred embodiment our invention provides a method of encapsulating or coacervating disperse dyes suspended in an aqueous structured surfactant, containing dissolved electrolyte, which comprises adding an aqueous solution of encapsulant thereto. The dye and the encapsulant may be added together to the aqueous surfactant either before, after or simultaneously with the electrolyte.

The water soluble encapsulant for use according to our invention may be a water soluble film-forming organic macromolecule such as a polymer or gum. We particularly prefer a water soluble polyvinyl pyrrolidone.

We can also use a polyvinyl alcohol, a cellulose derivative such as carboxymethyl cellulose, methyl cellulose, or hydroxypropylcellulose, a ligin derivative such as lignin sulphonate, a gum such as guar gum, gum benzoin, gum tragacanth, gum arabic or gum acacia, a protein such as casein, gelatin or albumin, a carbohydrate such as starch, dextrose, galactose, or amylose, an amylopectin, or polycarboxylates such as polyacrylates or polymaleates. The encapsulant is preferably not a surfactant or polyglycol.

The water soluble encapsulant is preferably a water soluble polymer that is precipitated by electrolyte, to form a solid gelatinous or viscous film or coherent layer surrounding the dyestuff particles. The solution of the encapsulant may conveniently have a concentration of from 0.5% by weight of encapsulant based on the weight of the solution up to saturation.

Where a polymer such as, for example, polyvinyl pyrrolidone is used as the encapsulant we prefer to use a polymer with a molecular weight of from 10,000 to 1,500,000 e.g. 15,000 to 1,000,000 more preferably 20,000 to 900,000, especially 25,000 to 800,000. In the case of polyvinyl alcohol we particularly prefer polymers with a molecular weight of 18,000 to 140,000 preferably 50,000 to 120,000 e.g. 80,000 to 100,000.

Preferably any polyvinylalcohol used according to our invention is a partially hydrolysed polyvinyl ester of a lower (e.g. $C_1$ to 4) carboxylic acid, especially polyvinyl acetate, which has a degree of hydrolysis of greater than 25%, and desirably less than 95% especially 50 to 90% more preferably 60 to 80% e.g. 70% to 75%.

Other Ingredients

We prefer that the suspensions of our invention should have low foaming properties. While this can be achieved by selecting inherently low foaming surfactants, we generally prefer to include antifoams such as silicone oil antifoams, phosphate esters, fatty alcohols or hydrocarbon oils. Typically the antifoam is present in concentrations of 0.01 to 5% e.g. 0.05 to 1% by weight.

The composition may optionally include a suspending agent such as carboxymethyl cellulose or polyvinyl pyrrolidone, e.g. in amounts of from 0.1 to 5% preferably 0.5 to 2% by weight and a dispersing agent such as a lignosulphonate, alkyl naphthalene sulphonate or polyacrylate, e.g. in an amount of up to 10% by weight.

The composition may also, optionally, contain synergists, preservatives, buffers, antifreezes and fragrances.

We prefer that the composition does not contain any organic solvents, either water miscible solvents such as lower mono or polyhydroxy alchols, ketones and polyethers or water-immiscible solvents such aromatic hydrocarbons, nor any hydrotropes such as urea, benzene sulphonate or lower alkyl benzene sulphonates. Solvents and hydrotropes tend to interfere with surfactant structuring and require the use of substantially increased amounts of surfactant and/or electrolyte. They also increase the cost of the formulation without generally increasing performance. Aromatic solvents are in addition undesirable on toxicity grounds. We therefore prefer, if present at all, that solvents and hydrotropes are each present in proportions less than 10%, more preferably less than 5%, most preferably less than 1%, e.g. less than 0.5%, usually less than 0.1% and most commonly less than 0.05% by weight.

We similarly prefer that polymeric thickening agents such as gums are absent or present in concentrations less than 5%, preferably less than 0.5% since they are not generally necessary to stabilise the compositions and since they increase the cost and viscosity of the suspensions.

The invention will be illustrated by the following examples in which all percentages are by weight based on total weight.

EXAMPLE 1

A concentrated dispersion was made up from:

| | |
|---|---|
| Water | 31% |
| Disperse orange azo dye | 25% |
| Sodium salt of $C_{10-12}$ linear alkyl benzene sulphonic acid (LABS) | 33.3% |
| Sodium salt of the sulphate ester of the | 7.1% |
| triethoxylate of $C_{12}$ alcohol (KSN) | |
| Potassium chloride | 3% |
| Silicone defoamer | 0.1% |
| Sodium ligno sulphonate | 0.5% |

EXAMPLE 2

A concentrated dispersion was made up from:

| | |
|---|---|
| Water | 29.5% |
| Disperse orange azo dye | 25% |
| LABS | 33.3% |
| KSN | 7.1% |
| Potassium Chloride | 3% |
| Silicone defoamer | 0.1% |
| Polyacrylate " sold under the Registered Trade Mark "BEVALOID" 207 | 2% |

EXAMPLE 3

A concentrated dispersion was made up from:

| | |
|---|---|
| Water | 51.9% |
| Orange azo dye | 35% |
| Iso propylamine salt of dodecyl benzene sulphonic acid (isopropylamine LABS) | 12.6% |
| Silicone defoamer | 0.1% |
| Sodium lignosulphonate | 1% |

EXAMPLE 4

A concentrated dispersion was made up from:

| | |
|---|---|
| Water | 33.6% |
| Orange azo dye | 35% |
| LABS | 20% |
| Coconut diethanolamide (CDE) | 6% |
| Sodium Nitrate | 4% |
| Silicone defoamer | 0.1% |
| polyacrylate | 1.3% |

EXAMPLE 5

A concentrated dispersion was made up from:

| | |
|---|---|
| Water | 29.9% |
| Orange azo dye | 35% |
| LABS | 26.7% |
| CDE | 4% |
| $NaNO_3$ | 3% |
| Silicone defoamer | 0.1% |
| Sodium salt of dibutyl napthalene sulphonic acid | 1.3% |

EXAMPLE 6

A concentrated dispersion was made up from:

| | |
|---|---|
| Orange azo dye | 25% |

-continued

| Isotridecyl alcohol 8 mole ethoxylate | 1.1% |
|---|---|
| Isopropylamine LABS | 5.6% |
| Sodium salt of methyl napthalene sulphonic acid formaldehyde condensate (MNSF) | 1.5% |
| Silicone defoamer | 0.06% |
| Water | 68.74% |

EXAMPLE 7

A concentrated dispersion was made up from:

| Orange azo dye | 23% |
|---|---|
| Triethanolamine salt of phosphated tristyrylphenol 17 mole ethoxylate | 1.6% |
| Isopropylamine LABS | 7.4% |
| MNSF | 1.5% |
| Silicone defoamer | 0.06% |
| Water | 66.44% |

EXAMPLE 8

A concentrated dispersion was made up from:

| Blue anthraquinone disperse dye | 14.5% |
|---|---|
| isopropylamine LABS | 9.5% |
| MNSF | 1.5% |
| Silicone defoamer | 0.1% |
| Water | 74.4% |

All the foregoing Examples formed stable dispersions which dispersed well on pouring into a large quantity of cold water.

EXAMPLE 9

A printing paste was prepared comprising:

| Blue anthraquinone dye | 6% |
|---|---|
| Isopropyamine LABS | 12% |
| MNSF | 0.15% |
| Water | 81.85% |

EXAMPLE 10

A printing paste was prepared comprising:

| Orange azo dye | 4% |
|---|---|
| ISotridecyl alcohol 8 mole ethoxylate | 19% |
| Isopropylamine LABS | 9.5% |
| Ammonium orthophosphate | 4% |
| Sodium Lignosulphonate | 0.1% |
| Silicone defoamer | 0.1% |
| Water | 63.3% |

EXAMPLE 11

A printing paste was prepared comprising:

| Blue dye | 2% |
|---|---|
| Isopropylamine LABS | 18% |
| Sodium naphthalene sulphonate | 0.1% |

The products of examples 9, 10 and 11 had good stability and rheological properties, and excess was readily removed on rinsing.

EXAMPLE 12

A mixture of disodium salt of 4;4'-[di(styryl-2-sulphonic acid)] biphenyl and the di sodium salt of 4;4-[di(4-chlorostyryl-3-sulphonic acid)] biphenyl sold commercially for use as an OBA by Ciba-Geigy under the Registered Trademark "TINOPAL" ATS-X was suspended in a composition comprising:

| LABS | 11.5% |
|---|---|
| coconut monoethanolamide | 1.5% |
| "TINOPAL" ATS-X | 35.0 |
| sodium silicate | 6.0 |
| water | balance |

The surfactant and silicate were mixed in the above relative proportions, together with the minimum amount of water to maintain a stirrable composition. The OBA was then gradually stirred in, adding just sufficient water with each addition of OBA, to maintain a stirrable mixture. Finally the mixture was diluted with water, to a convenient viscosity for handling. In order to obtain an optimum combination of visocity and storage stability it is preferred to prepare a series of samples at different dilutions and to test them for storage stability e.g. by standing at ambient temperature for three months. The more dilute compositions show signs of instability while the more concentrated show good stability but higher viscosity.

EXAMPLE 13-16

Suspensions of OBA solid under the Registered Trade Mark "TINOPAL" LMS/X were prepared according to the following table.

| Example | 13 | 14 | 15 | 16 |
|---|---|---|---|---|
| OBA | 30 | 30 | 25 | 20 |
| isopropylamine LABS | 8 | 8 | — | 8 |
| MNSF | — | 1 | — | 1 |
| 30% LABS aqueous solution | — | — | 33 | — |
| KSN | — | — | 7.1 | — |
| potassium chloride | — | — | 3 | — |
| silicone defoamer | — | — | 0.1 | — |
| water | 62 | 61 | 31.8 | 71 |

We claim:

1. A dye composition consisting essentially of an aqueous structured surfactant having suspended therein particles of a sparingly water soluble or substantially water insoluble dye, wherein said dye is present in an amount of at least 6% by weight, based on the total weight of the composition.

2. The dye composition according to claim 1 wherein said aqueous structured surfactant comprises surfactant spherulites interspersed with an aqueous phase.

3. The dye composition according to claim 1 wherein said aqueous structured surfactant comprises an open lamellar structure interspersed with an aqueous phase.

4. The dye composition according to claim 1 comprising from 2 to 65% by weight, based on the total weight of the composition, of surfactant.

5. The dye composition according to claim 4 comprising from 4 to 50% by weight of surfactant.

6. The dye composition according to claim 1 further comprising from 1 to 50% by weight, based on the total weight of the composition, of dissolved surfactant desolubililzing electrolyte.

7. The dye composition according to claim 6 comprising from 2 to 15% by weight of said dissolved surfactant desolubilizing electrolyte.

8. The dye composition according to claim 1 comprising from 6 to 50% by weight of said dye.

9. The dye composition according to any one of claims 1 to 3 wherein surfactant is present in said composition in an amount sufficient to form said structured surfactant, and said composition further comprises a dissolved surfactant desolubilizing electrolyte, if required to form said structured surfactant, present in an amount sufficient to salt said surfactant out of aqueous micellar solution to the extent required to form said aqueous structured surfactant.

10. The dye composition according to claim 8 wherein said dye is selected from the group consisting of disperse dyes and optical brightening agents.

11. The dye composition according to claim 1, comprising from 15 to 40% by weight, based on the total weight of the composition, of said dye, and further wherein said dye is a disperse dye and said composition is dispersed in water to form a dyebath.

12. The dye composition according to claim 1, comprising from 6 to 15% by weight, based on the total weight of said composition, of said dye and further wherein said dye is a disperse dye, and said composition is a printing paste.

13. The dye composition according to claim 1, comprising from 15 to 40% by weight, based on the total weight of the composition, of said dye and further wherein said dye is an optical brightening agent, and said composition is for use in the manufacture of detergents.

14. A dye composition consisting essentially of:
  (1) an aqueous structured surfactant comprising
    (i) water, and
    (ii) 2 to 65% by weight, based on the total weight of the composition, of surfactant, and
    (iii) 0 to 50% by weight, based on the total weight of the composition, of a dissolved surfactant desolubilizing electrolyte
  and
  (2) from 6 to 50% by weight, based on the total weight of the composition, of solid particles of a substantially water insoluble or sparingly soluble dye.

15. The dye composition according to claim 14 comprising from 14 to 40% by weight of said dye, and further wherein said dye is an optical brightening agent.

16. The dye composition according to claim 14 comprising from 6 to 50% by weight of said dye, and further wherein said dye is a disperse dye.

* * * * *